United States Patent [19]

Takada

[11] Patent Number: 4,636,596
[45] Date of Patent: Jan. 13, 1987

[54] POWER SWITCH FOR A BATTERY
[75] Inventor: Mitsuo Takada, Tokyo, Japan
[73] Assignee: Nikko Co., Ltd., Tokyo, Japan
[21] Appl. No.: 774,741
[22] Filed: Sep. 11, 1985
[51] Int. Cl.<sup>4</sup> .................. H01H 3/16; F21V 23/04
[52] U.S. Cl. ............................ 200/52 R; 200/60; 200/61.79
[58] Field of Search ............ 200/52 R, 60, 61.19, 200/61.76, 61.79, 61.8, 153 LA, 61.58 R; 362/203–206, 208, 155, 251, 295, 394, 802

[56] References Cited

U.S. PATENT DOCUMENTS

| | | | |
|---|---|---|---|
| 1,782,015 | 11/1930 | Sachs | 200/60 UX |
| 1,919,024 | 7/1933 | Abbotts | 200/60 X |
| 2,486,909 | 11/1949 | Babajoff | 200/61.79 |
| 2,580,956 | 1/1952 | Reddick | 200/60 X |
| 2,765,396 | 10/1956 | Iverson | 362/203 |
| 3,071,747 | 1/1963 | Moore | 200/60 X |
| 3,564,761 | 2/1971 | Bear et al. | 200/60 |
| 4,517,628 | 5/1985 | McDermott | 200/60 |

FOREIGN PATENT DOCUMENTS 54-179428 12/1979 Japan .

Primary Examiner—J. R. Scott
Attorney, Agent, or Firm—Sandler & Greenblum

[57] ABSTRACT

A power switch for a battery is disclosed, which includes a battery-receiving chamber having anodic and cathodic contacts for the battery, an aperture provided centrally in the anodic contact, and a switching mechanism having a protrusion which is movable through the aperture relative to the anode of the battery. The switching device comprises an on-off switch which is positioned within the battery receiving case to minimize damage to the switch. The switch operates by moving the anode of a battery towards and away from a contact to make or break a series circuit between a plurality of batteries located in the battery-receiving chamber. Movement of the anode in an axial direction is effected by axial movement of a protuberance on the switching device.

5 Claims, 3 Drawing Figures

4,636,596

POWER SWITCH FOR A BATTERY

FIELD OF THE INVENTION

This invention relates to a battery-receiving case for electric appliances on electrically movable toys containing batteries, and more particularly to a novel power switch for a battery which is integral with the battery-receiving case.

BACKGROUND OF THE INVENTION

For electric appliances or electrically movable toys, ON-OFF operation of the power source has conventionally been conducted by a switching mechanism which is connected to the battery-receiving case through lead wires extended therefrom. For this reason, the switching mechanism requires various components, such as conducting contacts, which are contacted with and spaced apart from each other, and thus considerably increases the production costs necessary to satisfy requirements of high operability and durability as well as compact formation. Switching mechanisms of relatively low cost may be available but readily suffer from failure. Further, such conventional types of switching mechanisms readily suffer from snapping accidents, especially those caused by shocks or vibrations externally exerted on an electric toy, and thus it became impossible to give full function of the toy.

Accordingly, an object of the invention is to provide a power switch for a battery which may avoid use of lead wires and conducting contacts and which may be formed integrally to a battery-receiving case for ensuring ON-OFF operation of the power source, which is simple in construction but has sufficiently high strength to prevent snapping or contacting accidents, and which may be produced at a low cost.

SUMMARY OF THE INVENTION

The power switch for a battery according to the invention comprises a battery-receiving chamber having a contact electrically contacted with an anode of the battery and a contact electrically and elastically contacted with a cathode of the battery; an aperture provided in a center of the contact to the anode; and a switching mechanism having a protrusion which is movable through the aperture relative to the anode for allowing the anode to be contacted with or spaced apart from the contact to the anode.

A power switch of a simple construction and stable operation, according to the invention, may be readily produced at a low cost by directly utilizing the function of the contacts electrically contacted to the battery received in the battery-receiving chamber in such a way that one pole of the battery may be forcibly spaced apart from the contact.

Accordingly, in the power switch formed according to the invention, the switching mechanism may preferably comprise a pushing element of an insulating material having a protrusion, and a slidably operating element contacted with the pushing element for moving the protrusion.

According to this embodiment, the pushing element and the slidably operating element may have mutually contacting faces with curved, stepped portions which are engaged with each other to move the protrusion of the pushing element.

Further, in a power switch formed according to the invention, the battery-receiving chamber is preferably formed to receive therein a plurality of batteries in such a way that the contacts to each battery are arranged to ensure series connection of the batteries, and wherein the switching mechanism is provided only for moving one of the contacts relative to one of the batteries.

The invention will be described in more detail with reference to the accompanying drawings.

PREFERRED EMBODIMENTS OF THE INVENTION

Figure 1:
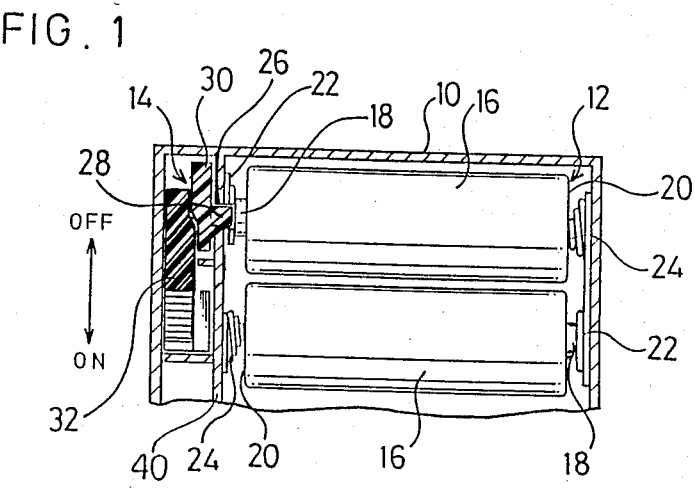
FIG. 1 is a plan view of one embodiment of a power switch for a battery according to the invention.
Figure 2:
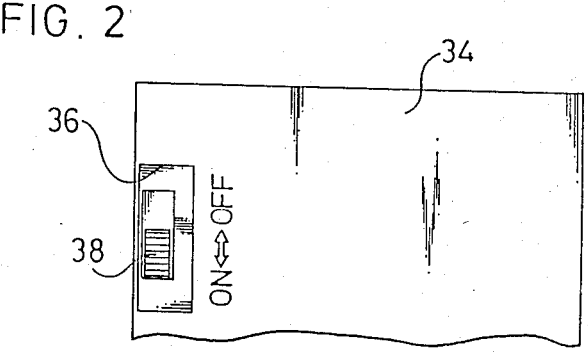
FIG. 2 is a schematic view showing an arrangement of an operational portion of the switch of FIG. 1, relative to a battery-receiving case.
Figure 3:
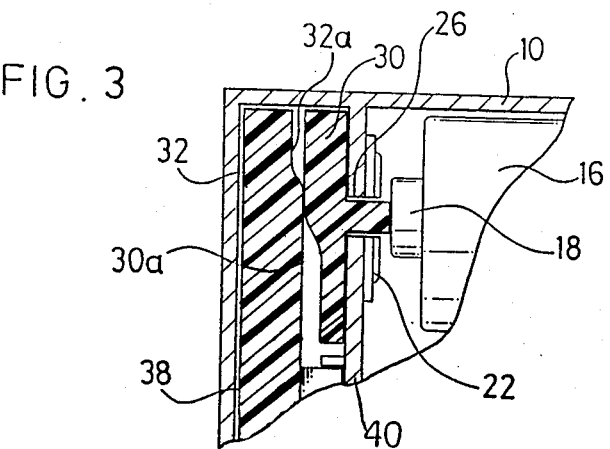
FIG. 3 is an enlarged plan view of a main portion showing an operating state of the switching mechanism of FIG. 1.

FIGS. 1 to 3 illustrate one embodiment of a power switch formed according to the invention. In FIG. 1, the numerical reference 10 represents a battery-receiving case which is formed as a cassette casing removably mounted to an electric appliance or toy, or as an integral casing provided integrally to a body of the electric appliance or toy.

The battery-receiving case 10 according to this embodiment comprises a battery-receiving chamber 12 and a switching mechanism section 14 adjacent to the battery-receiving chamber 12. The chamber 12 may be formed to receive a plurality of batteries 16, and is provided with contacts 22, 24 which are electrically contacted to an anode 18 and a cathode 20 of each received battery 16. The contact 22 to the anode 18 is formed generally as a fixed plate, while the contact 24 to the cathode 20 is formed as a spring capable of providing an axial elastic force against the battery 16. These contacts 22, 24 are connected to the batteries simultaneously received in the chamber 12 and are arranged in such a way that the batteries 16 may be connected in series to provide a constant power output to a given power terminal (not shown). A wall or partition 40 separates battery receiving chamber 12 from switching mechanism section 14.

In accordance with the invention, the contact 22 adjacent to the anode 18 in one of the batteries 16 connected in series is provided at its center with an aperture 26, through which is passed a protrusion 28 of a pushing element 30 made of insulating material. The pushing element 30 is received in the switching mechanism section 14 so as to enable the protrusion 28 to be contacted with anode 18. Further, within the switching mechanism section 14 is arranged a slidably operating element 32 which may be slidably contacted to the pushing element 30 for moving the protrusion 28 axially to the battery 16. The slidably operating element 32 is provided with an operational portion 38 which is exposed through an opening 36 provided at a portion of a cover plate 34 and is slidable in the required direction when the battery-receiving chamber 10 is closed by cover plate 34, as shown in FIG. 2.

Contacting faces of the slidably operating element 32 and the pushing element 30 are provided respectively with curved step portions 32a and 30a, as shown in FIG. 3, which are contacted with each other along their upper sections to allow protrusion 28 to be extended through aperture 26 from an end face of contact 22. In other words, when the slidably operating element 32 and the pushing element 30 are contacted with each other by step portions 32a and 30a along their lower sections (or when the operational portion 38 is set to the ON-position as shown in FIG. 2), the protrusion 28 of the pushing element 30 is retracted from the end face of the contact 22 for allowing the contact to be contacted with anodic terminal 18 of the battery 16, thereby to keep the electrically conducting state (FIG. 1). On the other hand, when the slidably operating element 32 and the pushing element 30 are contacted with each other by the stepped portions 32a, 30a along their upper sections (or when the operational portion 28 is set to the OFF-position in FIG. 2), the protrusion 28 of the pushing element 30 urges the anodic terminal 18 against an elastic force of the spring contact 24 connected to the cathode 20 of the battery 16, thereby to space the contact 22 apart from the anode 18 (FIG. 3). As a result, the anode 18 of the battery 16 is electrically disengaged from the contact 22 to shut off the power.

As described hereinabove, the power switch according to the invention is provided integrally with the battery-receiving case, in which the function of the contacts connected to both poles of the battery may be directly utilized to conduct the ON-OFF operation for the power source, so that the leading wires and the conducting contacts of the conventional switching mechanism may be eliminated to produce a compact switch with fewer components at a low cost. Thus, the power switch according to the invention, when used in an electrically movable toy, may solve the problems of failure of the switching mechanism and snapping accidents of the leading wires, thereby to conveniently manufacture a strong and durable toy at a low cost.

In the embodiment described hereinabove, engagement between the slidably operating element and the pushing element has been illustrated with their respective curved stepped portions, but is not limited thereto and may be of any type provided that the protrusion is movable relative to the anode of the battery.

Although the invention has been described hereinabove with reference to the preferred embodiment, it will be appreciated that many variations and modifications may be made without departing from the spirit and scope of the invention.

What is claimed is:

1. A power switch for a battery which is adapted to be used with a battery-receiving chamber having room for receiving at least one battery, said chamber having at least first and second opposed outer walls and an intermediate wall located between said opposed walls, a first electrical contact positioned on said intermediate wall, said first contact being electrically connected to an anode of a battery when said battery is inserted into said chamber, and a second electrical contact which is in electrical and resilient contact with a cathode of said battery when said battery is inserted into said chamber, wherein said first contact has an aperture located along a central portion of said contact, said aperture being aligned with a similar aperture in said intermediate wall, said device further comprising a switching mechanism which includes an insulative operating element, said operating element having a protuberance which is moved through said aligned apertures in an axial fashion relative to said anode of said battery for selectively moving said battery anode towards and away from said first contact.

2. A power switch in accordance with claim 1, wherein said switching mechanism further comprises a second, slidable pushing element formed from an insulating material, wherein said pushing element and said operating element each have a camming surface.

3. A power switch according to claim 2, wherein the camming surfaces are curved step surfaces which engage each other and move said operating element in an axial fashion in response to sliding motion of said pushing elements, said protuberance contacting said anode to move said battery away from said contact when said pushing element is moved toward said operating element in a direction substantially perpendicular to the axial motion of said protuberance.

4. A power switch in accordance with claim 1 wherein said battery-receiving chamber is sufficiently large so as to receive a plurality of batteries, said batteries being connected to each other in series, said battery-receiving compartment further comprising third and fourth electrical contacts engaging the anode and cathode, respectively, of said second battery.

5. A battery switch for a battery positioned within a battery-receiving chamber, said chamber having means for receiving at least two batteries and comprising first and second opposed exterior walls which are substantially parallel to each other and an intermediate wall which is located between said first and second walls and which is substantially parallel to said first and second walls, the space defined between said first wall and said intermediate wall comprising an area for receiving said batteries, the space defined between said intermediate wall and said second exterior wall comprising a section for receiving a switching mechanism, said section further comprising a first transverse wall located between said intermediate wall and said second exterior wall, said switching mechanism comprising an insulative slidable pushing element slidable in a direction parallel to said first and second exterior walls within said switching mechanism section and a second, operating element adapted to be moved axially in response to sliding movement of said slidable element, said operating element comprising a camming surface and a protuberance, said protuberance extending through aligned apertures in said intermediate wall and through a first electrical contact attached to an inner surface of said intermediate wall which faces an interior surface of said first exterior wall, a second, spring contact being positioned on the interior surface of said first exterior wall, wherein a battery is inserted within said battery-receiving chamber, said battery having a cathode resiliently and electrically contacting said second contact element and an anode which selectively contacts said first contact wherein said anode of said battery is spaced from said first contact when said protuberance is forced through said aligned apertures and into said battery-receiving chamber by slidable movement of said pushing element.

* * * * *